United States Patent [19]

Sun et al.

[11] Patent Number: 5,407,479
[45] Date of Patent: Apr. 18, 1995

[54] SOL-GEL β-ALUMINUM TITANATE THIN FILM COATING

[75] Inventors: Tawei Sun, Blacksburg; Nancy R. Brown; Jesse J. Brown, Jr., both of Christiansburg, all of Va.

[73] Assignees: The Center for Innovative Technology, Herndon, Va.; Virginia Polytechnic Institute & State University, Blacksburg, Va.

[21] Appl. No.: 98,202

[22] Filed: Jul. 28, 1993

[51] Int. Cl.$^6$ ............................ C09K 3/00; B01J 13/00
[52] U.S. Cl. ............................ 106/287.19; 252/309; 252/313.1; 501/12
[58] Field of Search ............... 252/313.1, 309; 501/12; 106/286.2, 286.4, 286.5, 287.19

[56] References Cited

U.S. PATENT DOCUMENTS 5,047,174 9/1991 Sherif .................................. 252/309

FOREIGN PATENT DOCUMENTS 52-11285A 3/1976 Japan .

OTHER PUBLICATIONS

Okamura et al., "Preparation and Sintering of Monosized Al2O3–TiO2 Composite Powder", *J. Am. Ceram. Soc.*, 69(2) C-22-C-24 (1986).
Prasadarao et al., "Enhanced Densification By Seeding of Sol-Gel Derived Aluminum–Titanate", *J. Am Ceram. Soc.*, 75(6) 1529–33 (1992).
Derwent Abstract AN 77-76968Y/43 (corresponding to J52-111285).

*Primary Examiner*—Robert L. Stoll
*Assistant Examiner*—Daniel S. Metzmaier
*Attorney, Agent, or Firm*—Whitham, Curtis, Whitham & McGinn

[57] ABSTRACT

$\beta$-Al$_2$TiO$_5$ protective coatings have been developed for both dense and porous ceramics such as SiC and Si$_3$N$_4$ using a chemical solution processing method involving the hydrolysis and condensation of aluminum tri-sec butoxide and titanium butoxide. The solution viscosities, pH values, H$_2$O/alkoxide molar ratios, and dip coating withdrawal rates required for crack-free $\beta$-Al$_2$TiO$_5$ are 1.0 to 6.2 cP, pH 1–4.5, molar ratio 1.5–10, and withdrawal rate of 2.2–8.0 cm/min, respectively. Conversion of the amorphous coating to crystalline $\beta$-Al$_2$TiO$_5$ is achieved by a succession of calcination below 450° C. and a final heat-treatment at 1300° C. for ten hours with controlled heating and cooling rates.

1 Claim, 2 Drawing Sheets

006
SOL-GEL β-ALUMINUM TITANATE THIN FILM COATING

BACKGROUND OF THE INVENTION

1. Field of the Invention

The invention generally relates to sol-gel processes and formulations for fabricating β-aluminum titanate ($Al_2TiO_5$) coatings on different dense and porous substrates.

2. Description of the Prior Art

Frequently, ceramic materials with desired high temperature mechanical properties need surface modifications to improve corrosion and/or oxidation resistance. SiC and $Si_3N_4$ are widely used high temperature structural materials for high efficiency heat engines, particulate filters, and gas turbines. The performance of SiC and $Si_3N_4$ greatly relies on the integrity of the surface oxide layer which retards further oxidation of the underlying material. Severe strength degradation has been frequently observed when the surface protective film deteriorates as a result of chemical attack. Large pits formed after exposure in hostile environments, through either active or passive oxidation, are responsible for strength reductions. Atmospheres containing oxygen, hydrogen-steam, or alkalies are known to attack both SiC and $Si_3N_4$.

β-$Al_2TiO_5$ is an engineering material component which is characterized by its low thermal expansion, excellent thermal shock resistance, and thermal conductivity. β-$Al_2TiO_5$ has been used in heat engines including portliners of piston heads, turbocharger linings, and insulation valves.

SUMMARY OF THE INVENTION

It is an object of this invention to provide a sol-gel formulation and process for fabricating $Al_2TiO_5$ coatings on dense and porous substrates. It is another object of this invention to provide a sol-gel formulation and process for forming crack-free coatings on the surface and interior sections of porous materials such as ceramic filters.

It is another object of the invention to provide a coating and method which can be used to improve the high temperature corrosion resistance of ceramics such as SiC and $Si_3N_4$ as well as be used to provide thermal insulation coatings for oxide and non-oxide based ceramics.

According to the invention, β-$Al_2TiO_5$ has been identified as a useful coating material for both dense and porous ceramics. The coating can be used to provide both protection against chemical attack and for thermal insulation applications. The β-$Al_2TiO_5$ coatings are prepared using a sol-gel technique followed by a controlled heat treatment. The solutions used for making the β-$Al_2TiO_5$ coating contain stoichiometric amounts of Al and Ti precursors, ethyl alcohol, nitric acid, and deionized water with pH values ranging from pH 1.0 to pH 4.5, $H_2O$/alkoxide molar ratios from 1.5 to 10.0, and viscosities from 1.0 to 6.2 centipoise (cP). The solution used to create β-$Al_2TiO_5$ coatings can be applied to porous and dense ceramic substrates, such as SiC and $Si_3N_4$, by dip coating where the substrate withdrawal rate ranges between 2.2 and 8.0 cm/min. The conversion of the coating material to crystalline β-$Al_2TiO_5$ is achieved by a controlled drying process and crytallization heat treatment. The solution properties, coating rates, and heat treatments noted above have been found to be crucial parameters in forming crack-free β-$Al_2TiO_5$ coatings.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
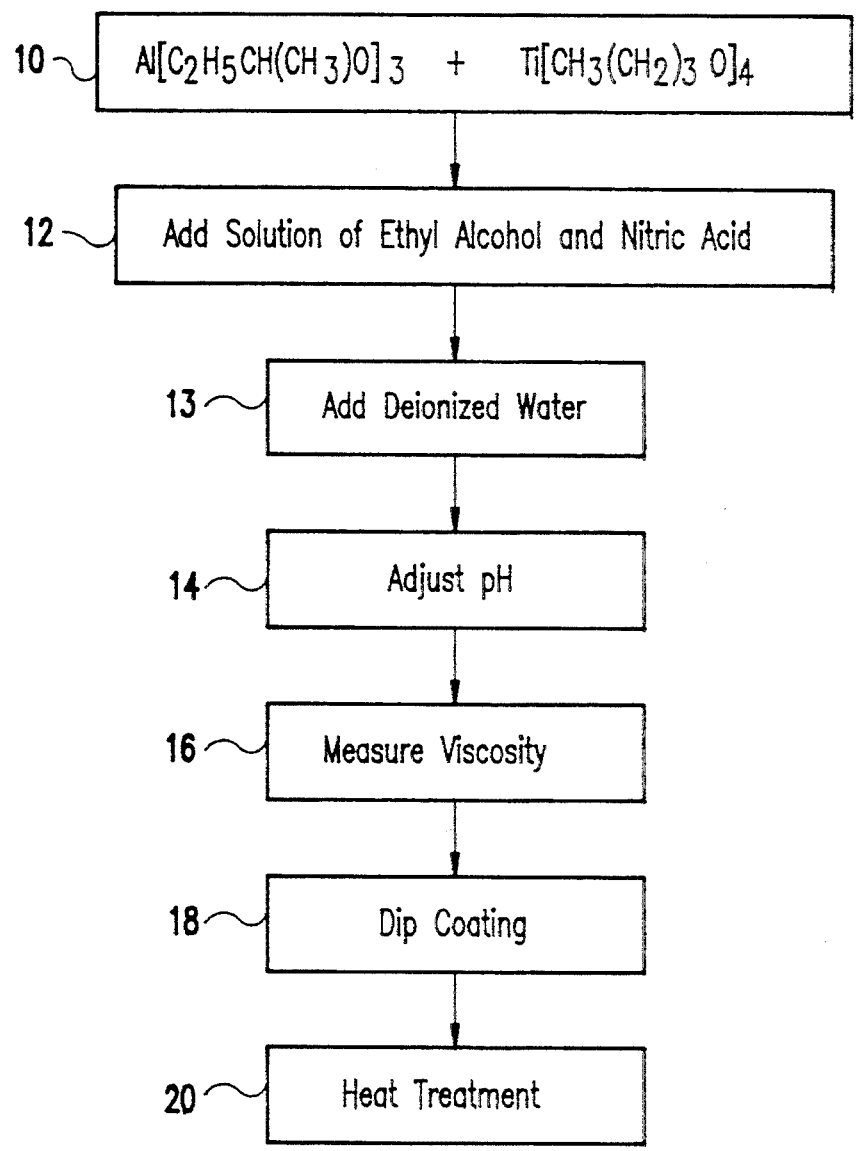
FIG. 1 is a schematic diagram showing the process for preparing and applying an $Al_2TiO_5$ coating to a ceramic substrate.

The inventors have determined the unique thermal properties of β-$Al_2TiO_5$ which make it an ideal protective coating material for ceramic materials such as SiC and $Si_3N_4$, as well as an ideal thermal barrier coating material for either oxide or non-oxide based ceramics. The conformity of thermal expansion between a coating material and a substrate is a particularly important criterion for a successful coating. The axial thermal expansion coefficients of β-$Al_2TiO_5$ along the crystallographic axes a, b, and c are $9.8 \times 10^{-6}/°C$, $20.6 \times 10^{-6}/°C$, and $-1.4 \times 10^{-6}/°C$, respectively. The linear thermal expansion coefficients for polycrystalline bodies are in the vicinity of $2 \times 10^{-6}/°C$, which is comparable to the thermal expansion coefficients of SiC and $Si_3N_4$. The thermal conductivity of polycrystalline $Al_2TiO_5$ is around 1.5 W/m.K, which is substantially lower than the thermal conductivities of most structural ceramics.

This invention is particularly directed to coating processes and formulations which allow the fabrication of crack-free β-$Al_2TiO_5$ coatings on dense and porous ceramic materials.

The raw materials used in the preparation of $Al_2TiO_5$ solutions included aluminum tri-sec butoxide, titanium butoxide, ethyl alcohol, nitric acid and deionized water. Appropriate amounts of aluminum tri-sec butoxide and titanium butoxide corresponding to the stoichiometric composition of $Al_2TiO_5$ should first be weighed and homogenized by stirring. A solution of ethyl alcohol and nitric acid with a resultant pH between 1.0 and 4.5 is then added drop by drop to the mixture of aluminum and titanium precursors under constant stirring conditions. Deionized water, which is required for the hydrolysis reactions of the alkoxides, is added to the last component added to the mixture and it is added with constant stirring. The pH of the mixture should be maintained at all times between pH 1 and pH 4.5, and is preferably less than pH 2. The acidic pH prevents the gellation of the aluminum and titanium precursors.

Table 1 shows a number of compositions of $Al_2TiO_5$ solutions with various $H_2O$/alkoxide ratios which have been prepared according to the above process; however, it should be understood that the amounts used can easily be scaled up for industrial applications and that the ratios of materials and pH conditions can be varied within the ranges specified.

TABLE 1

| Raw Materials | Composition (weight in grams) | | | | | | |
|---|---|---|---|---|---|---|---|
| | 1 | 2 | 3 | 4 | 5 | 6 | 7 |
| Al[$C_2H_5$CH-($CH_3$)O]$_3$ | 34.8 | 44.3 | 37.2 | 52.3 | 49.8 | 39.7 | 51.2 |
| Ti[$CH_3(CH_2)_3$O]$_4$ | 17.4 | 22.2 | 18.6 | 26.2 | 24.9 | 19.9 | 25.6 |
| $H_2O$ | 5.2 | 13.2 | 16.7 | 31.2 | 32.2 | 31.6 | 51.0 |
| ethyl alcohol | 73.6 | 78.5 | 70.5 | 70.5 | 80.5 | 79.8 | 85.6 |
| $H_2O$/alkoxide molar ratio | 1.5 | 3.0 | 4.5 | 6.0 | 6.5 | 8.0 | 10.0 |

Following the preparation of the $Al_2TiO_5$ solution, the solution viscosity needs to be measured according to standard methods (ASTM D445 and D446) prior to dip coating a ceramic substrate. The viscosity of the $Al_2TiO_5$ solution should be controlled between 1.0 and 6.2 cP by varying the $H_2O$/alkoxide molar ratio or by aging the solution (i.e., aging results in $H_2O$ evaporation which alters the molar ratio).

Once the viscosity of the $Al_2TiO_5$ solution is properly adjusted, ceramic substrates can be effectively dip coated. Experiments have shown the dip coating withdrawal rate used for both dense and porous SiC and $Si_3N_4$ must be less than 8.0 cm/min, and is preferably between 2.2 and 4.1 cm/min. The withdrawal rate for other ceramic materials should be similar. The coated ceramic substrates should then be dried prior to being exposed to a heat treatment which converts the coating to crystalline $\beta$-$Al_2TiO_5$. Drying can be accomplished by air drying in a closed container for twenty-four hours.

FIG. 1 presents the processing steps for preparing the $Al_2TiO_5$ solution and coating it on a porous or dense ceramic substrate. In steps 10, 12 and 13, the aluminum and titanium precursors are combined, and ethyl alcohol, nitric acid and deionized water are added. In step 14, the pH of the mixture is determined and adjusted to a level between pH 1 and pH 4.5 if required. In step 16, the viscosity of the mixture is determined and, if necessary, is adjusted to a level between 1 and 6.2 cP. Porous or dense ceramic substrates, such as SiC or $Si_3N_4$, are then dip-coated at step 18 with a controlled withdrawal rate from the mixture between 2.2 and 8.0 cm/min. After dip-coating of the substrate, the $Al_2TiO_5$ coating is dried and then subjected to a heat treatment at step 20 to form the crystalline $\beta$-$Al_2TiO_5$.

After a ceramic substrate has been dip coated with the $Al_2TiO_5$ composition, heating is used to convert the composition to crystalline $\beta$-$Al_2TiO_5$. The heat treatment should include both a low temperature evaporation of water and the organic species generated from the hydrolysis and condensation reactions, and a high temperature crystallization of the $\beta$-$Al_2TiO_5$ from its amorphous counterpart. Because cracks usually form during calcination, it has been found to be advantageous to utilize slow heating to minimize drying stresses. In addition, after high temperature crystallization which takes place at 1300° C., the specimens should be cooled to room temperature slowly to alleviate thermal stresses generated at the $\beta$-$Al_2TiO_5$/substrate interface.

Figure 2:
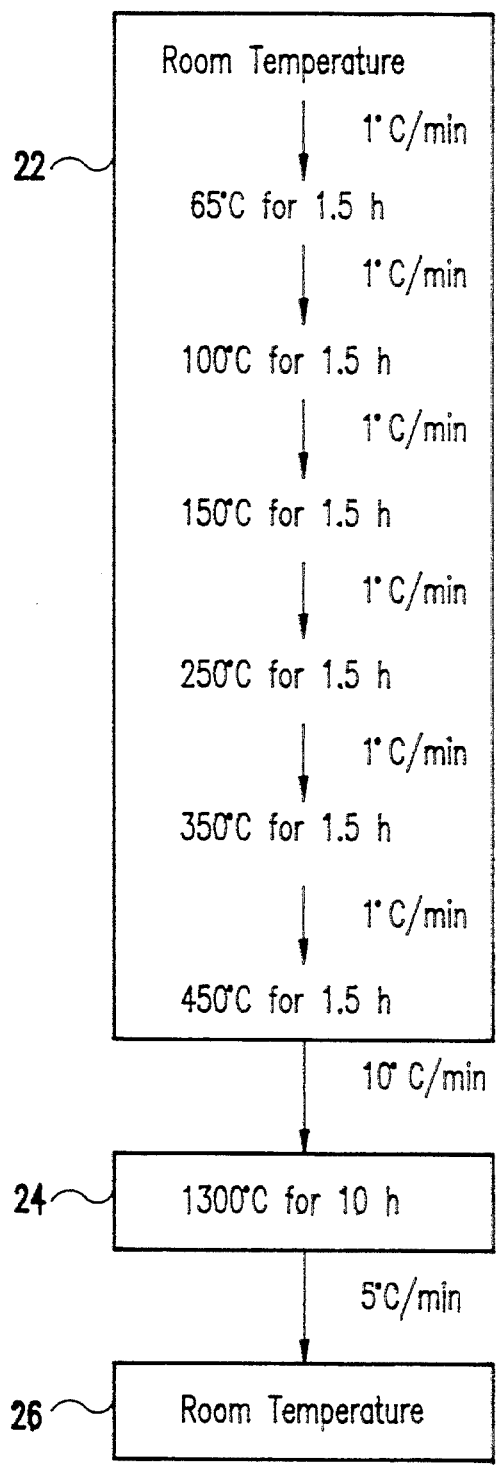
FIG. 2 is a schematic diagram showing the heat treatment process for converting the dip coated $Al_2TiO_5$ into crystalline β-$Al_2TiO_5$.

FIG. 2 shows a heat treatment process which has been successful in creating crack-free $\beta$-$Al_2TiO_5$ films on substrates. In step 22, the $Al_2TiO_5$ composition coated substrate is slowly brought to 450° C. in a stepwise fashion to drive off the organic species generated from the hydrolysis and condensation reactions without forming cracks or other imperfections in the coating. Ramping the heat at 1° C./min with holds at several intermediate temperatures (e.g., 65° C., 100° C., 150° C., 250° C., and 350° C.) has been found to be a suitable evaporation cycle which avoids the formation of cracks and imperfections in the $Al_2TiO_5$ coating. Once the heating cycle reaches 450° C., the substrate is coated with amorphous $Al_2TiO_5$ and all organic constituents have been driven off. At step 24, the amorphous $Al_2TiO_5$ coating is brought to a crystallization temperature (e.g., 1300° C.) and held at the crystallization temperature for a period of time (e.g., 10 hours) sufficient to convert the amorphous $Al_2TiO_5$ to crystalline $\beta$-$Al_2TiO_5$. After conversion of the coating to $\beta$-$Al_2TiO_5$, step 26 indicates that the substrate is returned to room temperature by a slow cooling procedure (e.g., reduce temperature by 5° C./minute). Slow cooling reduces or avoids thermal stress problems at the substrate/coating interface.

It should be understood that the heat treatment cycle shown in FIG. 2 can be varied considerably by changing ramp rates, hold temperatures, duration of holds, etc. However, it is essential that the heat treatment used provide for evaporation of water and the organic by-products, conversion of the coating to the crystalline $\beta$-$Al_2TiO_5$ form, and slow cooling to room temperature.

Results of X-ray diffraction analyses of SiC and $Si_3N_4$ specimens, both dense and porous, which were coated with the compositions of Table 1 by the coating procedure of FIG. 1 and which were subjected to heat treatment as shown in FIG. 2, indicated the formation of $\beta$-$Al_2TiO_5$ without the formation of $Al_2O_3$ or $TiO_2$. In the investigations, a dense substrated was defined as a body that contains no open pores and a porous substrate was defined as a body that contains open pores. Elemental mapping using energy dispersive x-ray (EDX) showed uniform distributions of Al and Ti on the outer surfaces of both the dense and the porous substrates. Scanning electron microscope (SEM) examination of the specimens revealed crack-free coatings on the outer surfaces of the substrates. Furthermore, SEM and EDX analyses of the interior sections of the porous substrates also showed the formation of a uniform, crack-free, $\beta$-$Al_2TiO_5$ coating. Thus, the process described herein can be used to form uniform coatings on the interior open pore walls of a porous ceramic substrate without closing the pores.

The sequence in which the chemicals are combined and the pH of the mixture are crucial to the formation of a homogeneous $Al_2TiO_5$ solution suitable for coating. To allow subsequent coating, the $Al_2TiO_5$ solution needs to be free from precipitation and/or instant gelation. Solid precipitates tend to cause composition segregation in the solution, and rapid gelation makes a uniform coating impossible. When ethyl alcohol or water alone is added to the mixture of aluminum and titanium precursors, precipitation or instant gelation occurs. As a result, the alcohol used to dilute the precursors needs to be pre-mixed with nitric acid to a resultant pH between 1.0 and 4.5 before it is added to the precursors, and the addition of the pre-mixed ethyl alcohol should precede the addition of the deionized water. When the pH of the alcohol-nitric acid solution is higher than 4.5, precipitation or instant gelation will also occur.

In addition, it has been found that the quality of the $\beta$-$Al_2TiO_5$ coating is strongly dependent on the solution viscosity and the withdrawal rate. High viscosity and quick withdrawal rates will cause cracking of the coated film because of the drying stresses generated during heat treatment. In order to form a crack-free coating, the solution viscosity should be kept below 6.2 cP. It has been found that the withdrawal rate cannot exceed 8.0 cm/min for viscosities less than 4.6 cP, and that when the viscosity is higher than 4.6 cP, the withdrawal rate required for crack-free coating cannot exceed 4.1 cm/min.

The coating process allows for easy coating and protection of a variety of substrates having arbitrary geometries. The process has demonstrated that crack-free $\beta$-Al$_2$TiO$_5$ coatings can be formed on substrates that are on the order of 1 $\mu$m thick. In addition, experiments have shown that the $\beta$-Al$_2$TiO$_5$ coatings can be successfully applied to porous materials without closing the pores, and therefore, the process can be used for filter material and catalyst applications.

While the invention has been described in terms of its preferred embodiments, those skilled in the art will recognize that the invention can be practiced with modification within the spirit and scope of the appended claims.

We claim:

1. A sol-gel formulation used for creating Al$_2$TiO$_5$ coatings on substrates, comprising a coating composition which includes stoichiometric quantities of Al[C$_2$H$_5$CH(CH$_3$)O]$_3$ and Ti[CH$_3$(CH$_2$)$_3$O]$_4$ dispersed in a solution containing ethyl alcohol, nitric acid and deionized water, said coating compositions having a pH ranging from pH 1 to pH 4.5, said coating composition having a viscosity ranging from 1 to 6.2 cP, said coating composition having a water/alkoxide molar ratio ranging from 1.5 to 10.

* * * * *